US012393017B2

(12) United States Patent
Torii

(10) Patent No.: US 12,393,017 B2
(45) Date of Patent: Aug. 19, 2025

(54) OCULAR OPTICAL SYSTEM AND IMAGE DISPLAY APPARATUS

(71) Applicant: CANON KABUSHIKI KAISHA, Tokyo (JP)

(72) Inventor: Takashi Torii, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 483 days.

(21) Appl. No.: 17/935,782

(22) Filed: Sep. 27, 2022

(65) Prior Publication Data
US 2023/0106139 A1 Apr. 6, 2023

(30) Foreign Application Priority Data
Sep. 30, 2021 (JP) .................... 2021-160937

(51) Int. Cl.
*G02B 27/28* (2006.01)
*G02B 5/30* (2006.01)
*G02B 25/00* (2006.01)
*G06F 1/16* (2006.01)
*G02B 13/18* (2006.01)

(52) U.S. Cl.
CPC ......... *G02B 25/001* (2013.01); *G02B 5/3083* (2013.01); *G02B 27/28* (2013.01); *G06F 1/163* (2013.01); *G02B 13/18* (2013.01)

(58) Field of Classification Search
CPC .... G02B 5/3083; G02B 27/28; G02B 27/017; G02B 27/0172; G02B 3/001; G02B 3/18; G02B 17/0856; G02B 2027/0178
See application file for complete search history.

(56) References Cited

U.S. PATENT DOCUMENTS

| 5,570,215 | A | 10/1996 | Omae et al. |
| 5,966,242 | A | 10/1999 | Yamanaka |
| 11,086,161 | B2 | 8/2021 | Richards et al. |
| 11,204,500 | B2 | 12/2021 | Takagi et al. |
| 2019/0079234 | A1* | 3/2019 | Takagi ............... G02B 27/0101 |

FOREIGN PATENT DOCUMENTS

JP 2020085956 A 6/2020

* cited by examiner

*Primary Examiner* — Angela M. Medich
(74) *Attorney, Agent, or Firm* — Canon U.S.A., Inc., IP Division

(57) ABSTRACT

An ocular optical system that guides light from a display element to an eye of an observer includes a first phase plate, a second phase plate, one or more lenses, and a polarization separation element configured to reflect first linearly polarized light and allow second linearly polarized light to pass therethrough in a polarization direction orthogonal to a polarization direction of the first linearly polarized light. The second phase plate is in contact with and held by a predetermined lens among the one or more lenses. The first phase plate has a shape that determines a phase. An outer shape of the predetermined lens is a rotationally symmetric shape. The second phase plate has a rotationally symmetric shaped portion and a non-rotationally symmetric shaped portion.

13 Claims, 7 Drawing Sheets

OCULAR OPTICAL SYSTEM AND IMAGE DISPLAY APPARATUS

BACKGROUND

Field of the Disclosure

The present disclosure relates to an ocular optical system and an image display apparatus using the same.

Description of the Related Art

A polarizing optical system that realizes reduction in size and weight thereof with a folded optical path using polarized light is known as a configuration of an optical system, as discussed in Japanese Patent Application Laid-Open No. 2020-85956. The polarizing optical system is configured with two phase plates and lenses and is also used in a head mounted display (HMD) that is required to reduce size and weight of the product. In a case where two phase plates are thus installed, a phase shift between the phase plates is to be reduced from a viewpoint of optical performance.

SUMMARY

According to an aspect of the present disclosure, an ocular optical system that guides light from a display element to an eye of an observer includes a first phase plate, a second phase plate, one or more lenses, and a polarization separation element configured to reflect first linearly polarized light and allow second linearly polarized light to pass therethrough in a polarization direction orthogonal to a polarization direction of the first linearly polarized light. The second phase plate is in contact with and held by a predetermined lens among the one or more lenses. The first phase plate has a shape that determines a phase. An outer shape of the predetermined lens is a rotationally symmetric shape. The second phase plate has a rotationally symmetric shaped portion and a non-rotationally symmetric shaped portion.

Further features of the present disclosure will become apparent from the following description of exemplary embodiments with reference to the attached drawings.

DESCRIPTION OF THE EMBODIMENTS

In a polarizing optical system, in order to make the size thereof more compact, for example, a phase plate which is arranged on an observer side (arranged adjacent to the observer) may be sometimes bonded to a lens.

However, in a case where an outer shape of the lens is a rotationally symmetric shape, it is difficult to determine a phase of the phase plate to be bonded to the lens, and optical performance may decrease due to degradation in a phase shift between the phase plates.

Exemplary embodiments of the present disclosure are made in consideration of the above-described issues.

The exemplary embodiments of the present disclosure will be described below with reference to the accompanying drawings.

Figure 1:
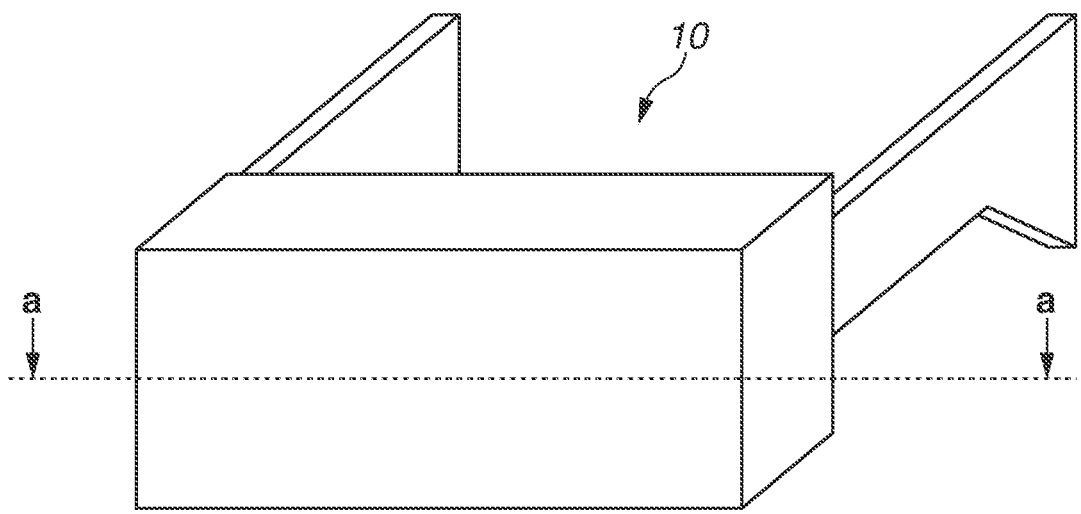
FIG. 1 illustrates an image display apparatus according to a first exemplary embodiment.
Figure 2:
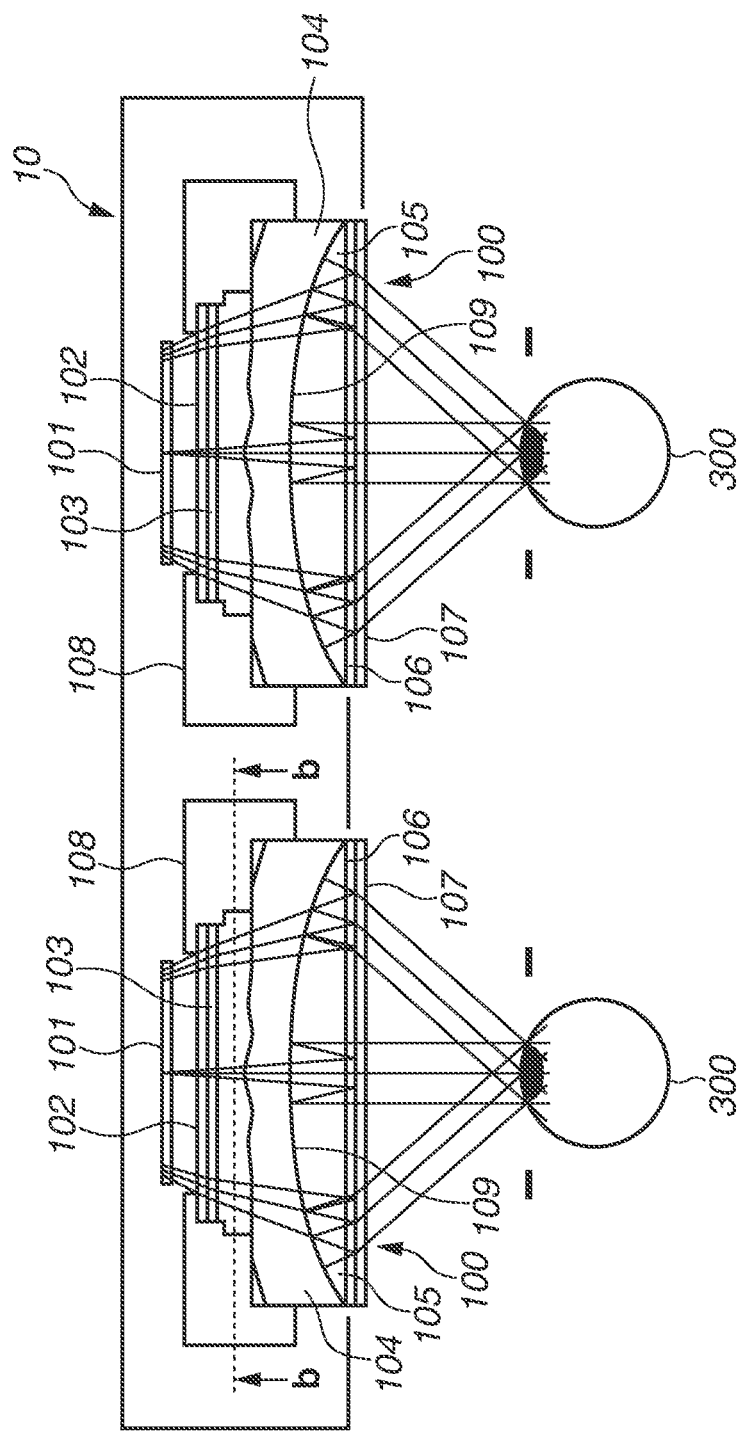
FIG. 2 is a sectional view of an ocular optical system according to the first exemplary embodiment.

A first exemplary embodiment of the present disclosure will be described. FIG. 1 illustrates an image display apparatus 10 according to the present exemplary embodiment. FIG. 2 is a cross-sectional view of the image display apparatus 10 taken along line a-a in FIG. 1. The image display apparatus 10 includes left and right ocular optical systems 100 and is suitable for use in a head mounted display (HMD) and a hand held display (HHD) as illustrated in FIG. 1.

The ocular optical systems 100 guide light from display elements 101 to the eyes 300 of a user who is an observer. The ocular optical system 100 magnifies and projects an original image displayed on the display element 101 as a virtual image and guides the virtual image to the eye 300 of the user. According to the present exemplary embodiment, the ocular optical systems 100 are configured as common components each having a common configuration so that it can be used for either the right or left eye, and are described below without distinction of right or left.

The respective ocular optical system 100 is a polarizing optical system in which an optical path is folded using polarized light. The optical path will now be described. As illustrated in FIG. 2, a polarizing plate 102, a first phase plate 103, lenses 104 and 105, a second phase plate 106, and a polarizing beam splitter (PBS) 107 which is a polarization separation element are arranged in this order from a display element 101 side in the ocular optical system 100. A lens barrel 108 holds the polarizing plate 102, the first phase plate 103, and the lens 104.

Outer shapes of the lenses 104 and 105 are circular shapes having rotationally symmetric shapes. The lens 104 and the lens 105 are cemented, and a semitransparent mirror 109 is deposited on a surface of the lens 104 facing a lens 105. The surface on which the semitransparent mirror 109 is deposited acts as a semi-transmissive reflective surface.

The first phase plate 103 and the second phase plate 106 are wavelength plates having a phase difference of $\lambda/4$. The polarizing plate 102 and the first phase plate 103 are bonded together. The second phase plate 106 and the PBS 107 are bonded together. The second phase plate 106 is held in contact with a user-side surface of the lens 105 in order to realize thinning of the ocular optical system 100. According to the present exemplary embodiment, the lens 105 corresponds to a predetermined lens according to the present disclosure.

A polarization direction of light that is allowed to pass through the polarizing plate 102 (hereinafter, referred to as "polarization direction of the polarizing plate") is inclined at 45 degrees with respect to a slow axis of the first phase plate 103. A polarization direction of light that is allowed to pass through the PBS 107 (hereinafter, referred to as "polarization direction of the PBS") is inclined at 45 degrees with respect to a slow axis of the second phase plate 106. The polarization direction of the polarizing plate 102 and the polarization direction of the PBS 107 are orthogonal to each other.

In this case, light emitted from the display element 101 passes through the polarizing plate 102 and becomes linearly polarized light. The linearly polarized light then passes through the first phase plate 103 and becomes circular polarized light. The circular polarized light having passed through the first phase plate 103 passes through the semi-transparent mirror 109 and then the second phase plate 106, and becomes linearly polarized light (referred to as first linearly polarized light). The polarization direction of the first linearly polarized light is orthogonal to the polarization direction of the PBS 107, and the first linearly polarized light is reflected by the PBS 107, passes through the second phase plate 106, and becomes the circular polarized light. The circular polarized light passed through the second phase plate 106 is reflected by the semitransparent mirror 109, passes through the second phase plate 106, and becomes linearly polarized light (referred to as second linearly polarized light). Unlike the first linearly polarized light, the polarization direction of the second linearly polarized light coincides with the polarization direction of the PBS 107, and the second linearly polarized light passes through the PBS 107 and is guided to the eye 300 of the user. The eye 300 of the user substantially coincides with an exit pupil of the ocular optical system 100.

Thus, the polarizing optical system that folds an optical path using polarized light as described above can be thinned, shorten a focal length, thus realizing image observation with a wide angle of view.

Figure 3:
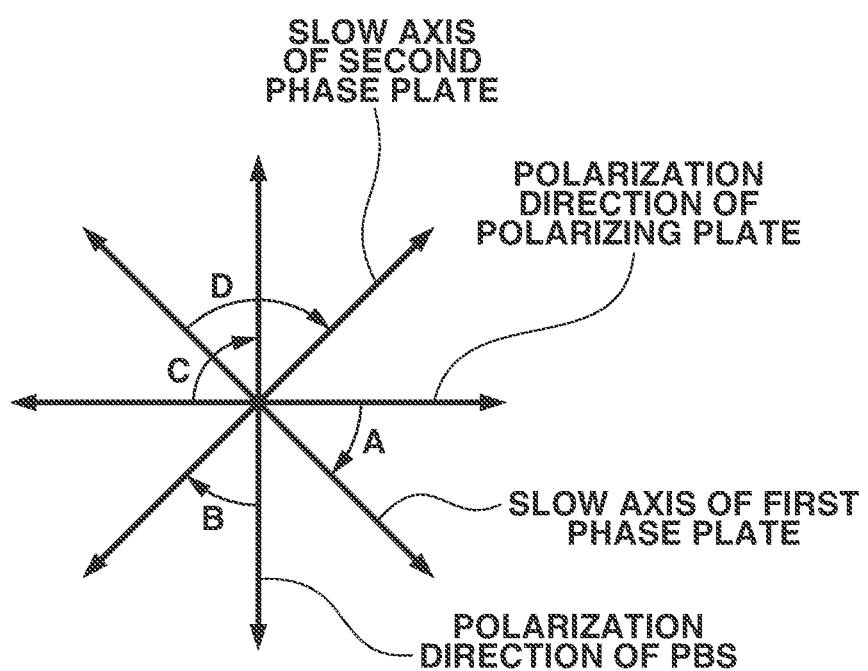
FIG. 3 illustrates relationship of slow axes of phase plates, a polarization direction of a polarizing plate, and a polarization direction of a polarization separation element in the ocular optical system according to the first exemplary embodiment.

As described above, ideally, as illustrated in FIG. 3, (A) it is desirable that the slow axis of the first phase plate 103 is inclined at 45 degrees with respect to the polarization direction of the polarizing plate 102. (B) It is also desirable that the slow axis of the second phase plate 106 is inclined at 45 degrees with respect to the polarization direction of the PBS 107. (C) It is also desirable that the polarization direction of the PBS 107 is inclined at 90 degrees with respect to the polarization direction of the polarizing plate 102. (D) It is also desirable that the slow axis of the second phase plate 106 is inclined at 90 degrees with respect to the slow axis of the first phase plate 103. However, in reality, a phase shift occurs, resulting in a degradation in the optical performance from an ideal state.

Regarding the description (A), if the polarizing plate 102 and the first phase plate 103 each have a flat plate shape and are bonded together with an adhesive layer, the phase shift can be stably reduced to bonding accuracy of each component. Similarly, regarding the description (B), if the second phase plate 106 and the PBS 107 each have a flat plate shape and are bonded together with an adhesive layer, the phase shift can be stably reduced to bonding accuracy of each component.

By contrast, regarding the description (C), the polarizing plate 102 and the PBS 107 are components separate from each other, so that it is difficult to stably reduce the phase shift and that the respective phases are to be clarified. Similarly, regarding the description (D), the first phase plate 103 and the second phase plate 106 are components separated from each other, so that it is difficult to stably reduce the phase shift and that the respective phases are to be clarified. The phase shift in the state (C) has an effect of increasing a ratio of ghost light to normal light. The phase shift in the state (D) has an effect of color shift.

A configuration for reducing the phase shift in the states (C) and (D) will be described below.

Figure 4:
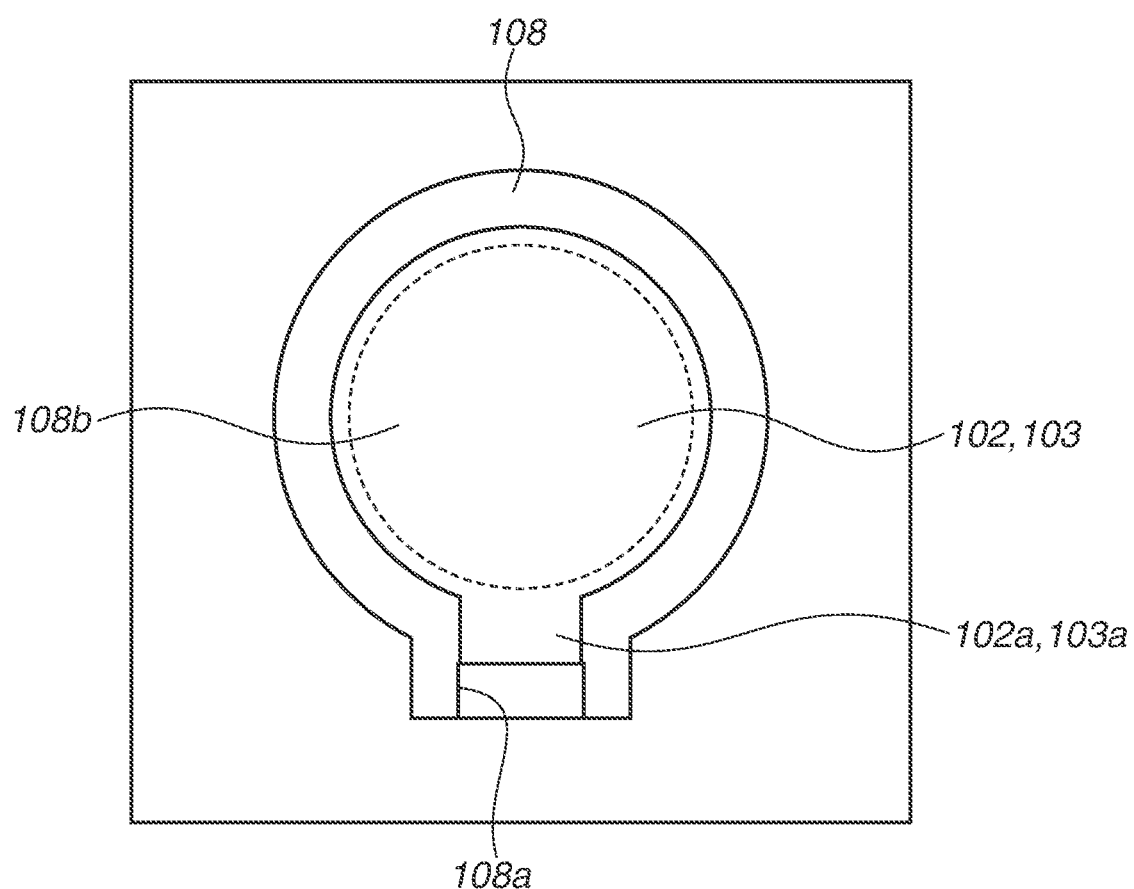
FIG. 4 illustrates a configuration for holding the polarizing plate and a first phase plate of the ocular optical system according to the first exemplary embodiment.

A configuration for holding the polarizing plate 102 and the first phase plate 103 with the lens barrel 108 will now be described with reference to FIG. 4. FIG. 4 is a sectional view taken along line b-b in FIG. 2.

The polarizing plate 102 and the first phase plate 103 have the same flat plate shape and are bonded together by the adhesive layer to form an integrated component. The flat plate shape partially has a non-rotationally symmetric shape that determines the phase, based on a circular shape that is rotationally symmetric. More specifically, a partially thickened tab portion 102a, which is a projection portion that projects laterally, is provided on a side portion of the polarizing plate 102. A partially thickened tab portion 103a, which is a projection portion that projects laterally, is provided on a side portion of the first phase plate 103. The angle between the polarization direction of the polarizing plate 102 and the slow axis of the first phase plate 103 is specified based on the tab portions 102a and 103a.

The lens barrel 108 corresponds to the rotationally symmetric shape of the polarizing plate 102 and the first phase plate 103 and has a hole 108b that does not block the light from the display element 101 and a groove 108a into which the tab portions 102a and 103a are fitted. Thus, the phase of the polarizing plate 102 and the phase of the first phase plate 103 can be specified with respect to the lens barrel 108. The polarizing plate 102 and the first phase plate 103, which are formed as the integrated component, may be bonded to the lens barrel 108 with an adhesive layer, and a holding structure is not limited.

Figure 5:
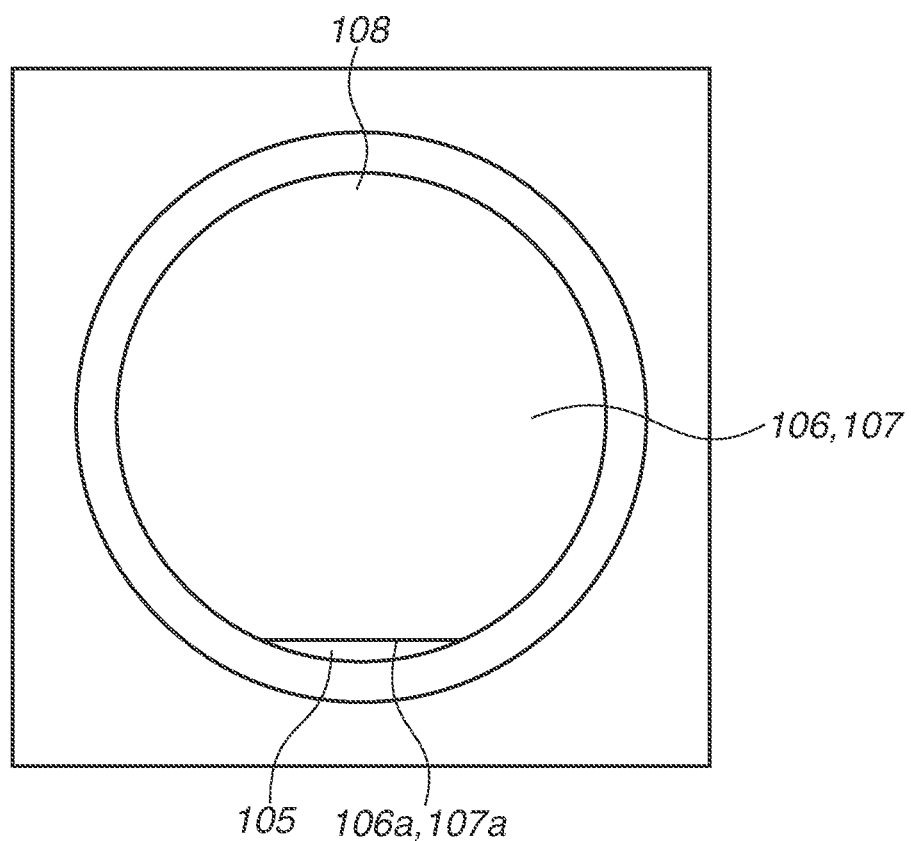
FIG. 5 illustrates a configuration for holding a second phase plate and a polarizing beam splitter (PBS) of the ocular optical system according to the first exemplary embodiment.

Next, a configuration for holding the second phase plate 106 and the PBS 107, which are held in contact with the lens 105, will be described with reference to FIG. 5. FIG. 5 illustrates the ocular optical system 100 viewed from a side of the eyes 300 of the user.

The second phase plate 106 and the PBS 107 have the same flat plate shape and are bonded together with the adhesive layer to form an integrated component. The flat plate shape partially has a non-rotationally symmetric shape that determines the phase, based on a circular shape that is a rotationally symmetric shape. More specifically, a partially thinned D-cut portion 106a is formed by a part of a side portion of the second phase plate 106 being cut out. A partially thinned D-cut portion 107a is formed by a part of a side portion of the PBS 107 being cut out. The slow axis of the second phase plate 106 and the polarization direction of the PBS 107 are specified based on the D-cut portions 106a and 107a.

The second phase plate 106 is held in contact with the lens 105 so that the D-cut portions 106a and 107a are horizontal. Thus, the phase of the second phase plate 106 and the phase of the PBS 107 is specifiable with respect to the lens barrel 108. The second phase plate 106 may be bonded to the lens 105 with an adhesive layer, and a contact holding structure thereof is not limited. After the second phase plate 106 integrated with the PBS 107 is bonded to the lens 105, the phase shifts of the second phase plate 106 and the PBS 107 with respect to the lens barrel 108 can be detected based on degrees of respective inclinations of the D-cut portion 106a of the second phase plate 106 and the D-cut portion 107a of the PBS 107, thus clarifying the phase shifts.

The configuration as described above enables clarification of the phase shifts regarding descriptions (C) and (D).

Thus, an angle formed by the polarization direction of the polarizing plate 102 and the polarization direction of the PBS 107 can be made substantially orthogonal (e.g., in a range of 90±5 degrees). An angle formed by the slow axis of the first phase plate 103 and the slow axis of the second phase plate 106 can be made substantially orthogonal (e.g., in a range of 90±5 degrees). The phase shifts in the descriptions (C) and (D) are reduced in this way, and thus the ocular optical system 100 that prevents degradation in the optical performance can be provided.

In the present exemplary embodiment, the display element 101 emits unpolarized light as an organic electroluminescent (EL) display, but may emit linearly polarized light as a liquid crystal display. In a case of the display element that emits the linearly polarized light, the polarizing plate 102 becomes unnecessary, and the thickness and cost can be reduced. However, it is desirable that the phase of the display element 101 is adjusted so as to reduce the phase shifts regarding the descriptions (A) and (C)

It is desirable that the lenses 104 and 105 are made from resin from the viewpoint of weight reduction, but may be made of glass. In the case of glass, birefringence of the lenses 104 and 105 becomes very small, so that high definition image observation becomes practicable. Further, the use of a plano-convex shape aspheric lens as the lens 105, a double-sided aspheric lens as the lens 104 enhances an aberration correction effect. Since the outer shapes of the lenses 104 and 105 are rotationally symmetric, it is not necessary to determine the phase, but the optical performance may be degraded due to a gate. Thus, it is desirable that the gate is arranged in a smaller one of a horizontal angle of view and a vertical angle of view that are determined based on the ocular optical system 100 and the display element 101. The lens 105 may be in contact with the lens barrel 108. Ultraviolet (UV) adhesive and the like may be used for a structure of the lens barrel 108 holding the lens 104 or the lens 105, and this holding structure is not limited.

There is concern about vignetting with respect to an optical effective diameter due to the D-cut portions 106a and 107a. The D-cut portions 106a and 107a are arranged in the smaller one of the horizontal angle of view and the vertical angle of view that are determined based on the ocular optical system 100 and the display element 101, and thus the influence of vignetting can be reduced or eliminated. Since the rotationally symmetric shape of the second phase plate 106 is the same as the rotationally symmetric shape of the lens 105, it is easy to determine positions thereof. Further, there is no step between the second phase plate 106 and the lens 105, and thus the definition can be improved. The ocular optical system 100 is the common component for the right and left eyes, so that the D-cut portions 106a and 107a in the ocular optical system 100 for the left eye and the D-cut portions 106a and 107a in the ocular optical system 100 for the right eye are placed at substantially the same positions.

The non-rotationally symmetric shape partially included in the first phase plate 103 is the tab portion 103a, but may be a D-cut portion. In this case, it is desirable that the D-cut portion is arranged in the smaller one of the horizontal angle of view and the vertical angle of view determined based on the ocular optical system 100 and the display element 101 as described above. The first phase plate 103 may not necessarily be based on the rotationally symmetric shape, and only needs to have a shape that determines the phase. The polarizing plate 102 and the first phase plate 103 which are the integrated component only need to be present between the lens 104 and the display element 101 and may not necessarily be held by the lens barrel 108, but are to be able to detect the degree of inclination of the shape that determines the phase.

The non-rotationally symmetric shapes partially included in the second phase plate 106 and the PBS 107 are the D-cut portions, so that the lens barrel 108 does not necessarily need to come into contact with the second phase plate 106 or the PBS 107 to determine the phase. Thus, the size and weight of the lens barrel 108 can be further reduced, but the shape may be extended in an optical axis direction in order to block external light incident on the inside from an outer diameter of the lens 104. The lens barrel 108 is placed away from the eyes 300 of the user across the PBS 107 in the optical axis direction, so that a surface closest to the eyes 300 of the user can be set to the PBS 107 that is a final optical surface. Thus, in a case where an eye relief of the ocular optical system 100 is a long eye relief in consideration of a user with glasses, the components of the image display apparatus 10 do not substantially shorten the eye relief. The components of the image display apparatus 10 may be set slightly closer to the eyes 300 of the user than the PBS 107 to the eyes 300 so that, when the image display apparatus 10 falls, the ocular optical system 100 does not hit first, while influence on the user with glasses are kept minimized.

The rotationally symmetric shape of the lens 105 and the second phase plate 106 that is held in contact with the lens 105 has been described to be the circular shape, but the shape is not limited to this example. In an n-fold rotationally symmetric shape, it becomes difficult to determine the phase of the second phase plate 106 to be bonded to the lens 105 particularly in a case where "n" is three or more, in such a case, it is desirable to apply the present disclosure.

A second exemplary embodiment of the present disclosure will be described below. Next, an ocular optical system 200 according to the present exemplary embodiment will be described with reference to FIGS. 6 and 7. Configurations similar to those according to the first exemplary embodiment are denoted by the same reference numerals, and the descriptions thereof are omitted.

Figure 6:
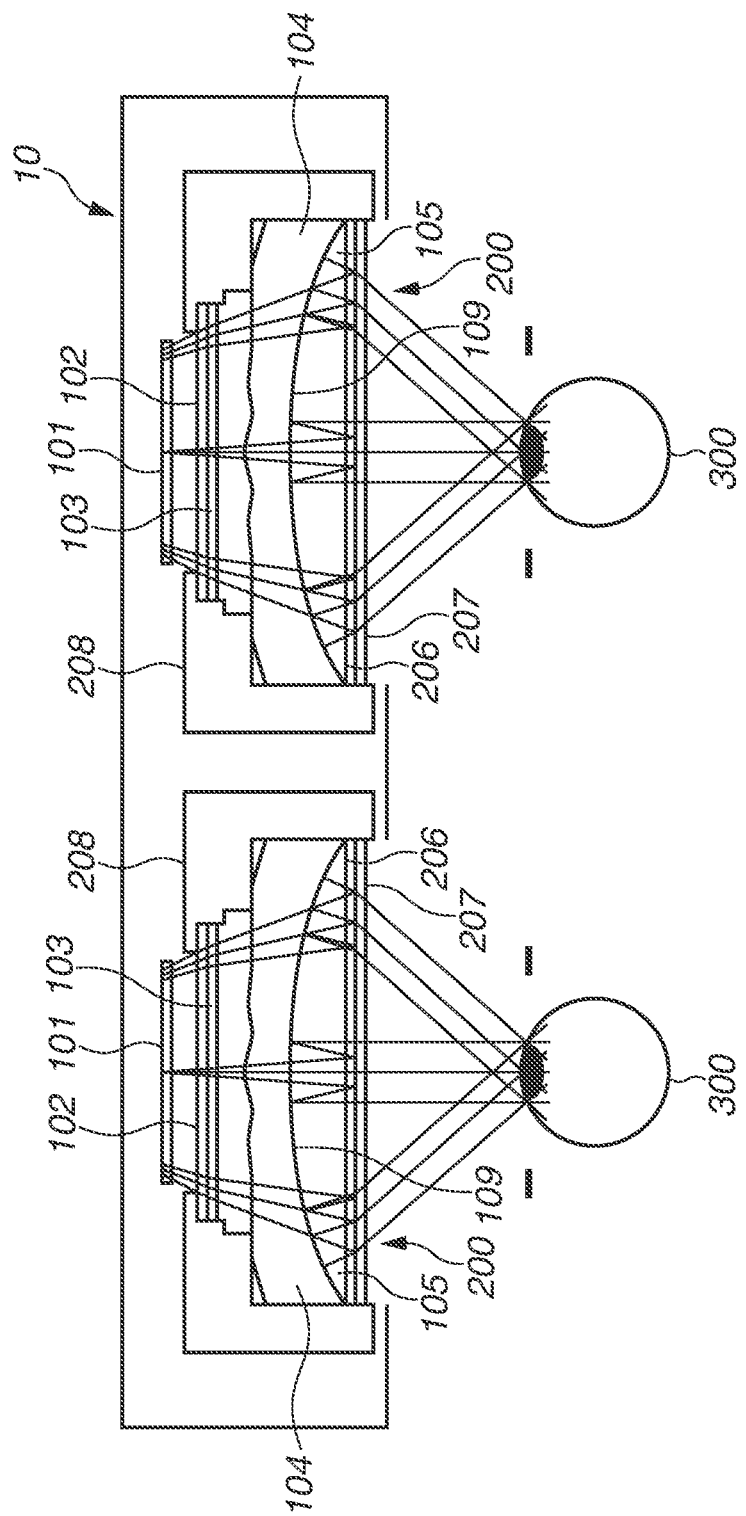
FIG. 6 is a sectional view of an ocular optical system according to a second exemplary embodiment.

FIG. 6 is a sectional view of the ocular optical system 200 and corresponds to FIG. 2 according to the first exemplary embodiment. As illustrated in FIG. 6, the polarizing plate 102, the first phase plate 103, the lenses 104 and 105, a second phase plate 206, and a PBS 207 are arranged in this order from the display element 101 side in the ocular optical system 200. A lens barrel 208 holds the polarizing plate 102, the first phase plate 103, the lens 104, the second phase plate 206, and the PBS 207.

Inclinations of the polarization direction of the polarizing plate 102, the slow axis of the first phase plate 103, the slow axis of the second phase plate 206, and the polarization direction of the PBS 207 are the same as those according to the first exemplary embodiment.

A configuration for holding the polarizing plate 102 and the first phase plate 103 by the lens barrel 208 is similar to that of the first exemplary embodiment.

Figure 7:
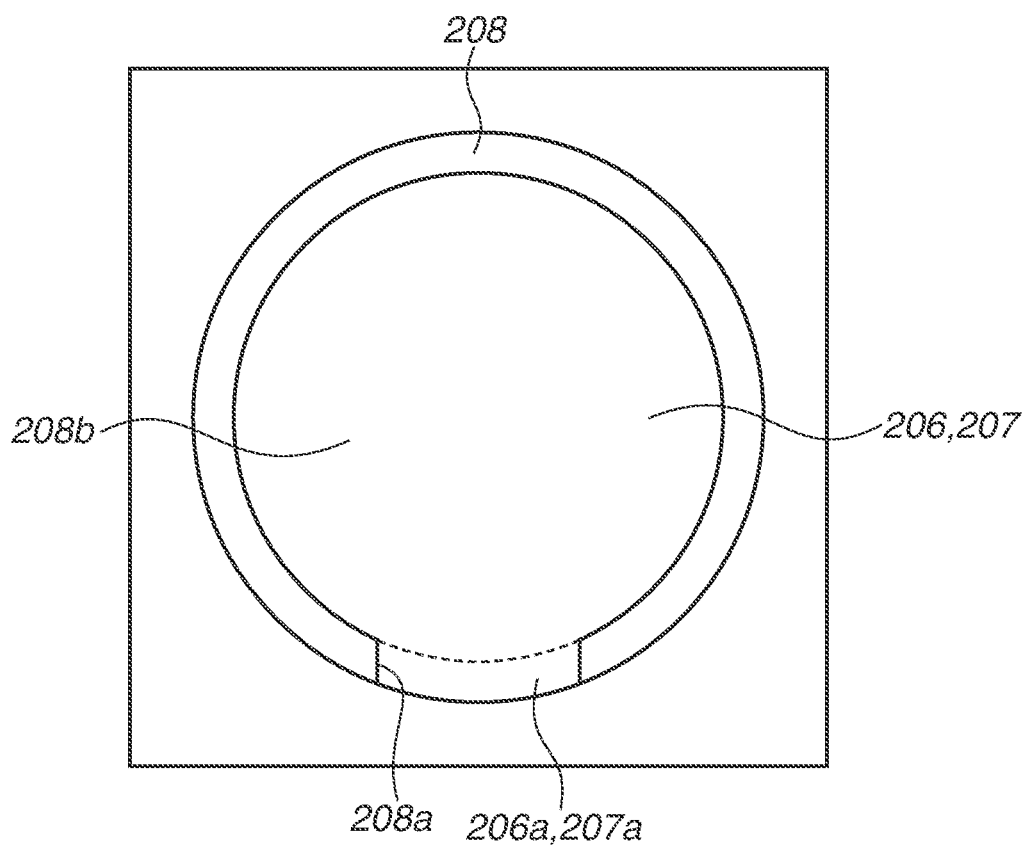
FIG. 7 illustrates a configuration for holding a second phase plate and a PBS of the ocular optical system according to the second exemplary embodiment.

Next, a configuration for holding the second phase plate 206 and the PBS 207 which are held in contact with the lens 105 will be described with reference to FIG. 7. FIG. 7 illustrates the ocular optical system 200 viewed from the eye 300 of the user.

The second phase plate 206 and the PBS 207 have the same flat plate shape and are bonded together with an adhesive layer to form an integrated component. The flat plate shape partially has a non-rotationally symmetric shape that determines the phase, based on a circular shape that is rotationally symmetric. More specifically, a partially thickened tab portion 206a which is a projection portion that projects laterally is provided on a side portion of the second phase plate 206. A partially thickened tab portion 207a which is a projection portion that projects laterally is provided on a side portion of the PBS 207. The slow axis of the second phase plate 206 and the polarization direction of the light are specified based on the tab portions 206a and 207a.

The lens barrel 208 corresponds to the rotationally symmetric shapes of the second phase plate 206 and the PBS 207 and has a hole 208b that does not block the light from the display element 101 and a groove 208a into which the tab portions 206a and 207a are fitted. Thus, the phase of the second phase plate 206 and the phase of the PBS 207 can be specified with respect to the lens barrel 208. The second phase plate 206 may be bonded to the lens 105 with an adhesive layer, and the contact holding structure thereof is not limited.

According to the second exemplary embodiment, the lens barrel 208 has a shape that determines the phases of the polarizing plate 102, the first phase plate 103, the second phase plate 206, and the PBS 207 in a single component, so that the phase shifts in the descriptions (C) and (D) can be more easily reduced than the first exemplary embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-160937, filed Sep. 30, 2021, which is hereby incorporated by reference herein in its entirety.

What is claimed is:

1. An image display apparatus comprising:
a display element; and
an ocular optical system configured to guide light from the display element to an eye of an observer, the ocular optical system including:
a first phase plate;
a second phase plate;
one or more lenses; and
a polarization separation element configured to reflect first linearly polarized light and allow second linearly polarized light to pass therethrough in a polarization direction orthogonal to a polarization direction of the first linearly polarized light,
wherein the second phase plate is in contact with and held by a predetermined lens among the one or more lenses,
wherein an outer shape of the predetermined lens is a shape based on a rotationally symmetric shape,
wherein the second phase plate has a shape based on a rotationally symmetric shape and includes a D-cut portion, and
wherein the D-cut portion is arranged in a smaller one of a horizontal angle of view and a vertical angle of view that are determined by the ocular optical system and the display element.

2. The image display apparatus according to claim 1, wherein the second phase plate and the polarization separation element have a same shape and are bonded together.

3. The image display apparatus according to claim 1, wherein the rotationally symmetric shape of the second phase plate is the same as the rotationally symmetric shape of the predetermined lens.

4. The image display apparatus according to claim 1, wherein an angle formed by a slow axis of the first phase plate and a slow axis of the second phase plate is 90±5 degrees.

5. The image display apparatus according to claim 1, further comprising a polarizing plate configured to allow light from the display element to pass therethrough.

6. The image display apparatus according to claim 5, wherein the polarizing plate and the first phase plate have a same shape and are bonded together.

7. The image display apparatus according to claim 5, wherein an angle formed by a polarization direction of the polarizing plate and a polarization direction of the polarization separation element is 90±5 degrees.

8. The image display apparatus according to claim 1, wherein the first phase plate is arranged adjacent to the display element, and the second phase plate is arranged adjacent to the observer.

9. The image display apparatus according to claim 1, further comprising a semi-transmissive reflective surface that allows light from the first phase plate to pass therethrough and reflects light from the second phase plate.

10. The image display apparatus according to claim 1, wherein the display element emits unpolarized light.

11. The image display apparatus according to claim 1, wherein a gate of the lens is arranged in a smaller one of a horizontal angle of view and a vertical angle of view that are determined by the ocular optical system and the display element.

12. The image display apparatus according to claim 1, wherein the ocular optical system for a left eye and the ocular optical system for a right eye are configured as a common component.

13. The image display apparatus according to claim 1, wherein the first phase plate has a shape that defines an arrangement of a slow axis of the first phase plate.

* * * * *